United States Patent [19]

Ozaki et al.

[11] Patent Number: 5,113,304

[45] Date of Patent: May 12, 1992

[54] DIGITAL PROTECTIVE CIRCUIT BREAKER

[75] Inventors: Masashi Ozaki, Suzuka; Katsuhiro Furukawa, Gifu, both of Japan

[73] Assignee: Kabushiki Kaisha Toshiba, Kanagawa, Japan

[21] Appl. No.: 500,361

[22] Filed: Mar. 28, 1990

[51] Int. Cl.$^5$ .................. H02H 3/18; H02H 3/26; H02H 3/42
[52] U.S. Cl. ........................ 361/87; 361/115; 361/97; 364/483
[58] Field of Search .............. 371/87, 115, 93, 94, 371/97; 364/483

[56] References Cited

U.S. PATENT DOCUMENTS

| | | | |
|---|---|---|---|
| 4,722,059 | 1/1988 | Engel et al. | 364/483 |
| 4,814,935 | 3/1989 | Arinobu et al. | 361/97 |

FOREIGN PATENT DOCUMENTS

| | | |
|---|---|---|
| 63-101036 | 4/1988 | Japan . |
| 63-101037 | 4/1988 | Japan . |
| 63-101038 | 4/1988 | Japan . |
| 63-97725 | 10/1988 | Japan . |

OTHER PUBLICATIONS

Japanese Laid-Open Patent Application No. 62-173930, dated Jul. 30, 1987.

*Primary Examiner*—Steven L. Stephan
*Assistant Examiner*—E. H. To
*Attorney, Agent, or Firm*—Philip M. Shaw, Jr.

[57] ABSTRACT

A circuit breaker includes a current detector for generator analog voltage signals in accordance with load current of respective phases and a control circuit for executing a tripping operation in response to the analog voltage signals. The control circuit includes an analog switch repeating a time division selecting operation that one of the analog phase voltage signals generated by the current detector is selectively allowed to pass through the same in a predetermined order, an analog-to-digital (A/D) converter for converting the analog voltage signal having passed through the analog switch to a a corresponding digital signal, and a microcomputer receiving the digital voltage signal from the A/D converter and obtaining the effective load current value based on the digital voltage signals. The microcomputer generates a tripping order when the effective load current value exceeds a predetermined value. The control circuit may include an amplifier for amplifying low level analog voltage signals and supplying the amplified signals to the A/D converter.

1 Claim, 11 Drawing Sheets

DIGITAL PROTECTIVE CIRCUIT BREAKER

BACKGROUND OF THE INVENTION

The present invention relates to circuit breakers which perform a tripping operation to thereby open contacts of main power line supplying loads with AC power when detecting an fault current, and more particularly to such circuit breakers having a fault current magnitude determining circuit arranged into a digital signal processing circuit.

Japanese Laid-open Patent Application No. 62-173930 discloses one of the above-described type circuit breakers, which is arranged as follows. Main power line contacts are interposed between a three-phase AC power source and main power line conductors for the three phases. The main power line contacts are opened when an automatic tripping device phases are provided with current transformers detecting load currents flowing through the main power line conductors, respectively. Secondary outputs of the current transformers are full rectified and then converted by I/V converters to three kinds of analog voltage signals indicative of the load current values of the three phase, respectively. A maximum phase discriminating circuit is provided at the output side of each I/V converter. Each discriminating circuit selects a maximum signal from among the analog voltage signals for the three phases and supply it to a signal conversion circuit. The signal conversion circuit is provided for obtaining an effective or average value of the analog voltage signals inputted. The value obtained by the signal conversion circuit is converted to a corresponding digital voltage signal by an A/D conversion circuit and then supplied to a microcomputer. The microcomputer determines the level of the load current indicated by the digital voltage signal input thereto. Based on the result of the load current level determining operation, the microcomputer performs a predetermined time-limiting operation and thereafter drives the automatic tripping device, thereby opening the main circuit contacts.

In the above-described conventional circuit breaker, the signal conversion circuit as an analog signal processing circuit is employed in order that the effective load current value is obtained. Accordingly, a large number of analog circuit elements need to be arranged, which complicates the circuit arrangement and increases the production cost of the circuit breaker. Furthermore, troublesome works are needed for adjustment of the output level of the signal conversion circuit.

SUMMARY OF THE INVENTION

Therefore, an object of the present invention is to provide a circuit breaker which realizes simplified circuit arrangement and reduced production cost and needs no troublesome work to adjust the output level of the signal conversion circuit and wherein the stable tripping operation can be performed.

The present invention provides a circuit breaker comprising main contacts for closing and opening electrical power supply paths of respective phases connected between loads and a polyphase AC power supply, current detecting means for detecting load currents flowing through the respective power supply paths, thereby generating analog voltage signals having levels in accordance with the detected load currents, and control means for tripping the main contacts in response to the analog voltage signals generated by the current detecting means, thereby opening the power supply paths. The control means comprises signal selecting means having a gate and repeating a time division selecting operation that one of the analog phase voltage signals generated by the current detecting means is selectively allowed to pass through the gate in a predetermined order, an analog-to-digital (A/D) conversion circuit for converting the analog voltage signal passing through the gate of the signal selecting means to a corresponding digital signal, and operation means provided for receiving the digital voltage signal from the A/D conversion circuit, the operation means generating a tripping signal when the load current value indicated by the digital voltage signal exceeds a predetermined value, thereby tripping the main contacts.

In accordance with the present invention, the current detecting means usually generates analog voltage signals in accordance with the load current values of the respective phases. The analog voltage signals are converted by the analog-to-digital conversion circuit to the corresponding digital voltage signals, which digital signals are supplied to the operation means. The operation means obtains an indicative value such as the mean load current value or the effective load current value, based on the values indicated by the digital voltage signals. When the indicative value exceeds a predetermined value upon occurrence of an abnormal condition such as an overload condition, the tripping instruction signal is generated by the operation means, thereby tripping the main contacts. The digital operation means ensures an accurate and stable tripping operation as compared with the analog operation circuit employed in the conventional device.

The operation to obtain the indicative value is performed based on the output data of the analog-to-digital conversion circuit and the time-division selecting operation of the signal selecting means allows circuit means operatively subsequent to the analog-to-digital conversion circuit to be commonly used for the three phases. Consequently, this arrangement brings about reduction of the number of circuit elements.

Other objects of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

Figure 1:
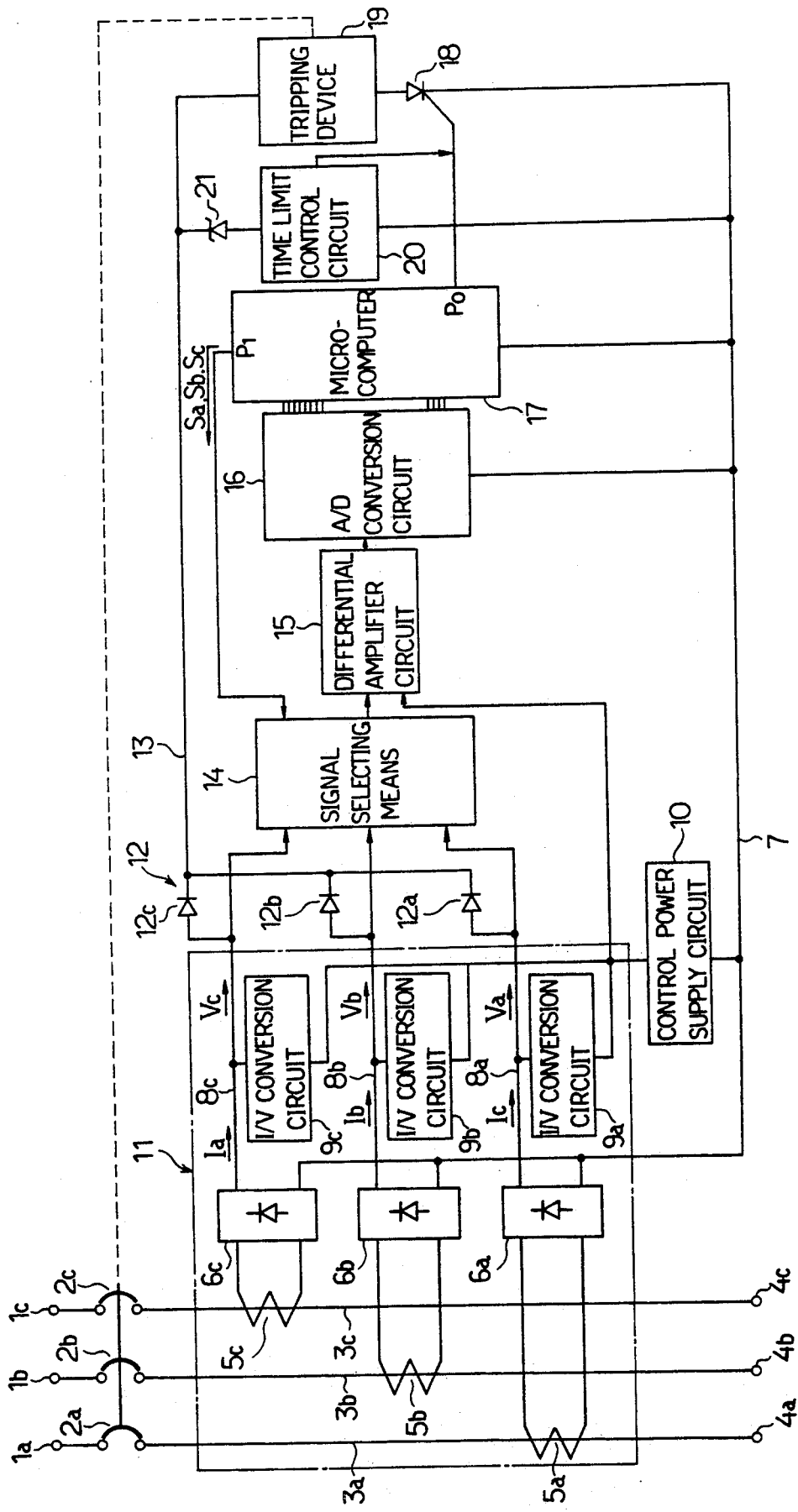
FIG. 1 is a block diagram showing an electrical arrangement of a circuit breaker of a first embodiment of the invention.
Figure 2:
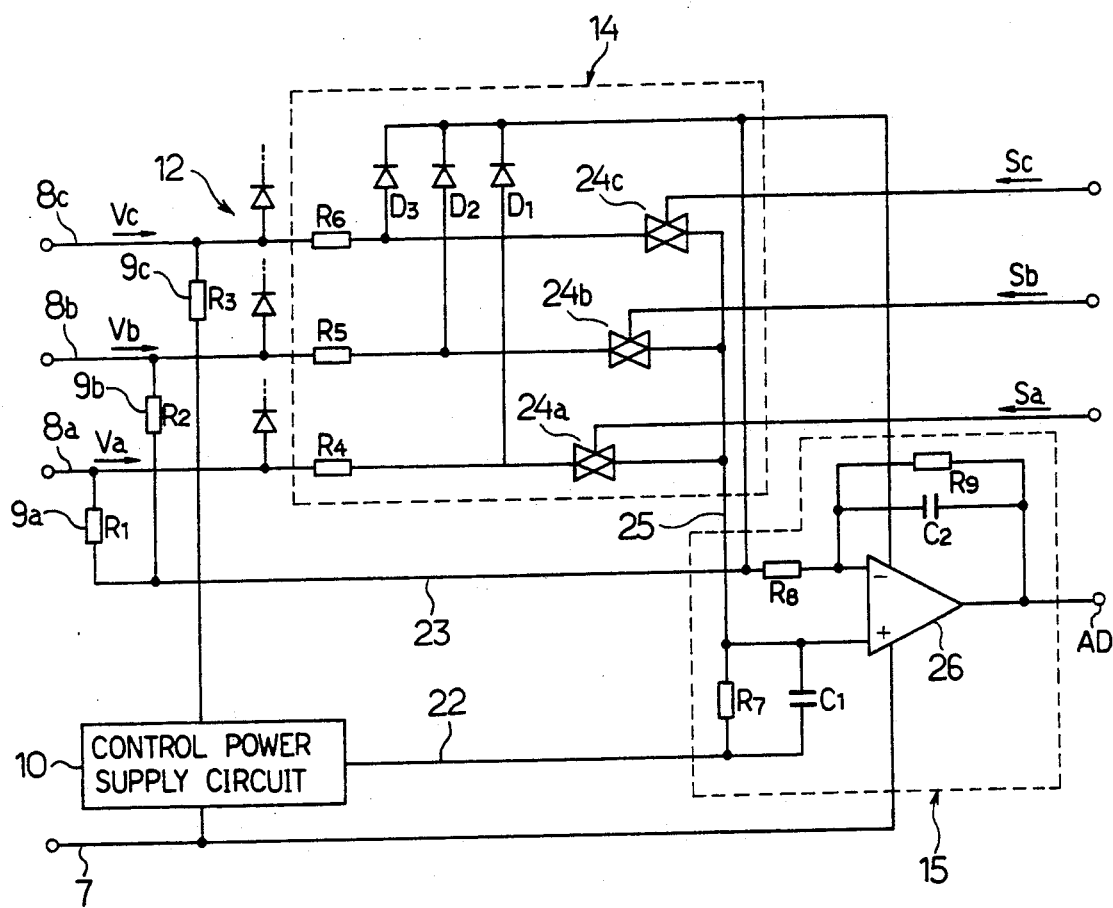
FIG. 2 is a wiring diagram of the major part of the circuit breaker in FIG. 1.

Several embodiments of the circuit breaker in accordance with the invention will now be described with reference to the accompanying drawings. Referring first to FIG. 1, power source side terminals 1a, 1b and 1c are to be connected to a three-phase AC power source (not shown) comprising phases A, B and C. Terminals 1a, 1b and 1c are connected to load side terminals 4a, 4b and 4c through main power line contacts 2a, 2b and 2c and main power line conductors 3a, 3b and 3c for supplying an electrical power to loads, respectively. Main power line conductors 3a, 3b and 3c are primary conductors of current transformers 5a, 5b and 5c, respectively. Secondary outputs of current transformers 5a, 5b and 5c for phases A, B and C are full rectified by rectifier circuits 6a, 6b and 6c, respectively. Negative output terminals of rectifier circuits 6a, 6b and 6c are connected to a reference potential line 7 and positive output terminals thereof are connected to respective lines 8a, 8b and 8c. Current-to-voltage (I/V) conversion circuits 9a, 9b and 9c convert detection currents from rectifier circuits 6a, 6b and 6c to corresponding analog voltage signals for phases A, B and C, respectively. I/V conversion circuits 9a, 9b and 9c comprise resistances R1, R2 and R3 connected between lines 8a, 8b and 8c and a control power supply circuit 10, respectively, as shown in FIG. 2. Accordingly, analog voltage signals Va, Vb and Vc in accordance with voltage drop at resistances R1, R2 and R3 appear at lines 8a, 8b and 8c, respectively. Voltage levels of analog voltage signals Va, Vb and Vc correspond to the detection current values Ia, Ib and Ic which are in accordance with the load current values of phases, respectively. Current detecting means 11 thus comprises current transformers 5a-5c, rectifier circuits 6a-6c and I/V conversion circuits 9a, 9b and 9c and detects load currents of phases A, B and C flowing through respective main power line into conductors 3a, 3b and 3c.

Current detecting means 11 produces at lines 8a, 8b and 8c analog voltage signals Va, Vb and Vc for phases A, B and C, respectively. Analog voltage signals Va, Vb and Vc are then supplied to a line 13 through a diode OR circuit comprising diodes 12a, 12b and 12c and further to signal selecting means 14. Signal selecting means 14 is responsive to an external turn-on signal to repeatedly perform a time-division selecting operation that the analog voltage signals Va, Vb and Vc are allowed to alternatively pass therethrough. Signal selecting means 14 will be described in detail later. Reference numeral 15 designates a differential amplifier circuit for amplifying the output of signal selecting means 14 and detailed arrangement thereof will also be described later.

An A/D conversion circuit 16 samples the outputs of differential amplifier circuit 15 or signals based on analog voltage signals Va, Vb and Vc at predetermined intervals and converts the sampled analog signals to corresponding digital signals. In this case, the outputs of differential amplifier circuit 15 are sampled for the sampling period of, for example, approximately 2 microseconds. The digital signals are supplied to a microcomputer 17 serving as a signal processing circuit. Microcomputer 17 controls the tripping operation wherein main power line contacts 2a-2c are opened, based on the load current values indicated by the output digital voltage signals from A/D conversion circuit 16. A control manner of microcomputer 17 will be described later. Microcomputer 17 is also arranged to control signal selecting means 14 for the purpose of time-dividing the signal processing operation. Microcomputer 17 produces at output port P1 drive signals Sa, Sb and Sc for operating signal selecting means 14. An output port P0 of microcomputer 17 is connected to the gate of a thyristor 18. The anode of thyristor 18 is connected through a well-known releasing type tripping device 19 to a line 13 and the cathode thereof is connected to line 7. When thyristor 18 is turned on, the tripping device 19 is energized to operate a tripping mechanism (not shown), thereby opening main power line contacts 2a, 2b and 2c. A time-limit control circuit 20 is connected between lines 7 and 13 through a Zener diode 21 connected so as to have the polarity as shown in FIG. 2. Time-limit control circuit 20 is energized in response to breakdown of Zener diode 21 and generates a trigger pulse after elapse of the time period in accordance with an applied voltage. The trigger pulse is supplied to the gate of thyristor 18. Electrical power is supplied from control power supply circuit 10 to signal selecting means 14, A/D conversion circuit 16 and microcomputer 17.

Referring to FIG. 2, resistances R1, R2 and R3 forming respective I/V conversion circuits 9a, 9b and 9c are connected between respective lines 8a, 8b and 8c and control power supply circuit 10, as described above. Control power supply circuit 10 produces at a line 22 an analog ground voltage (for example, 1 volt). Control power supply circuit 10 produces a high level voltage (for example, 6 volts) at line 23 commonly connected to resistances R2 and R3 and simultaneously reduces the voltage at line 7 to 0 volts. Thus, control power supply circuit 10 is arranged into a dual power supply configuration.

In signal selecting means 14, gates or analog switches 24a, 24b and 24c are provided for execution of the time-division control. Inputs of analog switches 24a, 24b and 24c are connected through resistances R4, R5 and R6 to lines 8a, 8b and 8c, respectively and outputs thereof are commonly connected to a line 25. Line 25 is connected through a resistance R7 to line 22 which is at the analog ground potential. An electrical noise absorptive capacitor C1 is connected in parallel with resistance R7. Drive signals Sa, Sb and Sc are supplied from microcomputer 17 to the gate terminals of analog switches 24a, 24b and 24c, respectively, which switches conduct. In the embodiment, each of the time-division signals or drive signals Sa, Sb and Sc comprises a row of pulses having a pulse width of ⅔ microseconds and period of 2 microseconds. These signals Sa, Sb and Sc are 120 degrees out of phase with one another. The anodes of diodes D1, D2 and D3 are connected to inputs of analog switches 24a, 24b and 24c, respectively so that an overvoltage is prevented from being applied to the inputs while analog switches are turned off. The cathodes of diodes D1, D2 and D3 are commonly connected to line 23.

In differential amplifier circuit 15, an operational amplifier 26 is supplied with electrical power from both lines 23 and 7. The non-inversion input terminal (+) of operational amplifier 26 is connected to a line 25 and the inversion input terminal (−) thereof is connected through a resistance R8 to line 23. A parallel circuit of a feedback resistance R9 and an electrical noise absorptive capacitor C2 is connected between an output terminal and inversion input terminal (−) of operational amplifier 26. The output terminal of operational amplifier 26 is further connected to an input terminal AD of A/D conversion circuit 16. Resistance values of resistances R4-R9 are set so as to be represented as R4=R5=R6=R8=Ra and R7=R9=Rb.

Figure 3:
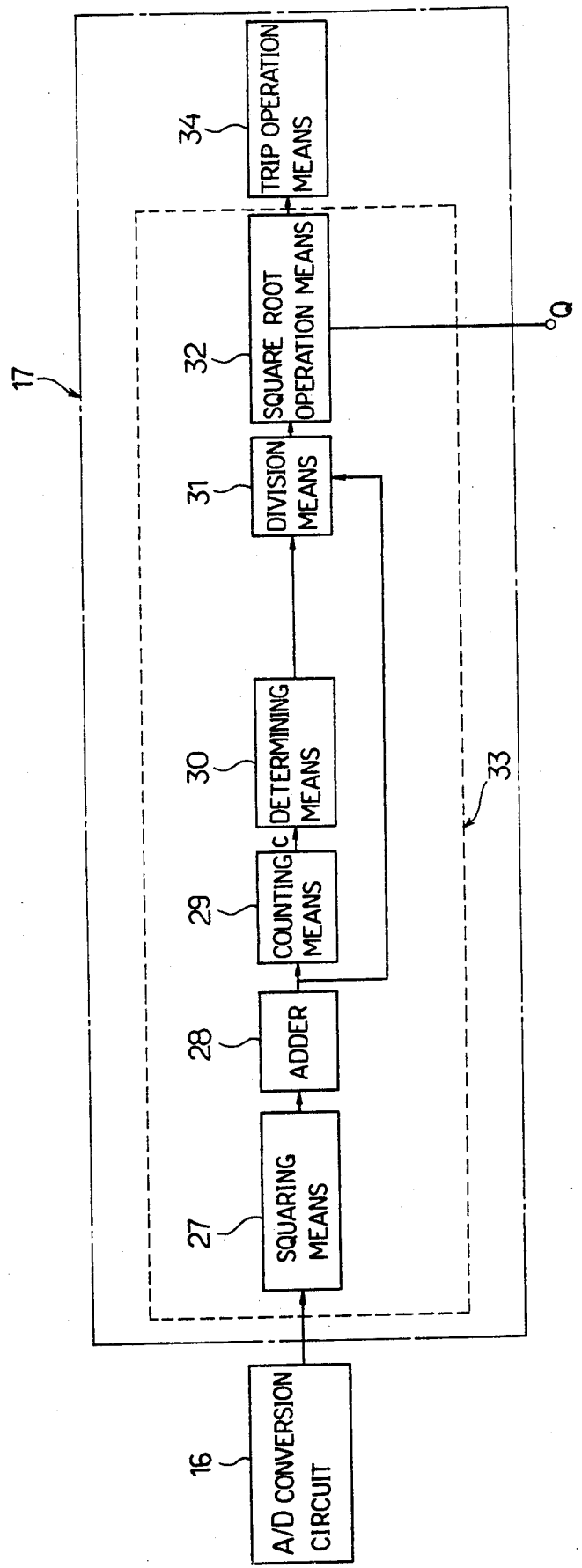
FIG. 3 is a block diagram of effective value operation means for explaining the function thereof.

Referring now to FIG. 3 showing a major part of microcomputer 17, squaring means 27 is provided for receiving the digital voltage signals from A/D conversion circuit 16 to thereby square the value (load current value) indicated by the digital voltage signal. An adder 28 is provided for accumulating the operational results obtained by squaring means 27. Counting means 29 is provided for counting the number of times of the accumulating operations of adder 28. Determining means 30 generates a division instruction signal when the counted value of counting means 29 reaches a predetermined value, for example, "128." Division means 31 operates to divide the operational result of adder 28 by the counted value obtained by counting means 29 or "128." Square root operation means 32 operates to obtain the square root value of the operational result of division means 31 and the obtained square root value corresponds to the effective value of the load current. Means 27 to 32 thus form effective load current value operation means 33. Adder 28 and counting means 29 are initialized every time division means 31 completes the dividing operation, for example. As the result of the above-described arrangement, an operation to obtain the effective load current value is performed for the period of 256 microseconds in the case where the sampling period is 2 microseconds, in synchronism with the time division cycle, thereby ensuring sufficient performance for obtaining the effective load current value for the circuit breaker.

Output of square root operation means 32 or the obtained effective load current value is supplied as a serial signal from a terminal Q to an external circuit which uses the signal for displaying the load current value on a display (not shown) and further to trip operation means 34. Trip operation means 34 operates to select the maximum effective load current value from among the effective load current values represented by the input data and determine the level of the maximum effective load current. Based on the determined level of the maximum effective load current, trip operation means 34 controls the trigger pulse supply to thyristor 18 or the tripping operation.

The operation of the above-described arrangement will now be described together with the control manner of microcomputer 17. In the condition that the load currents are flowing through main power line conductors 3a, 3b and 3c, respectively and analog voltage signals Va, Vb and Vc are supplied to lines 8a, 8b and 8c, respectively, control power supply circuit 10 operates to energize signal selecting means 14, differential amplifier circuit 15, A/D conversion circuit 16 and microcomputer 17.

When a small fault current not resulting in a short circuit flows through main power line conductors 3a-3c, analog voltage signals Va, Vb and Vc of the voltage levels corresponding to load current values of phases A, B and C are supplied from current detecting means 11 to lines 8a, 8b and 8c, respectively. As well known in the art, voltage signals Va-Vc take absolute value waveforms. Voltage signals Va, Vb and Vc are represented by the following expressions:

$$Va = R1Ia + Vz$$
$$Vb = R2Ib + Vz$$
$$Vc = R3Ic + Vz$$

where Vz=voltage applied between lines 23 and 7 from control power supply circuit 10.

Microcomputer 17 repeatedly supplies signal selecting means 14 with drive signals Sa, Sb and Sc at predetermined intervals in the state that drive signals Sa, Sb and Sc are time-divided in that order. Consequently, analog switch 24a conducts during duration of drive signal Sa. Analog voltage signal Va appearing at line 8a is supplied to the non-inversion input terminal (+) of operational amplifier 26 of differential amplifier circuit 15 through resistance R4, analog switch 24a and line 25. Furthermore, analog switch 24b conducts during the output period of drive signal Sb. Analog voltage signal Vb appearing at line 8b is supplied to the non-inversion input terminal (+) of operational amplifier 26 through resistance R5, analog switch 24b and line 25. Similarly, analog switch 24c conducts during the output period of drive signal Sc. Analog voltage signal Vc appearing at line 8c is supplied to the non-inversion input terminal (+) of operational amplifier 26 through resistance R6, analog switch 24c and line 25. In this respect, since line 25 is connected through resistance R7 to line 22 which is at the analog ground potential, analog voltage signals V'a, V'b and V'c supplied to the non-inversion input terminal (+) of operational amplifier 26 in response to conduction of analog switches 24a, 24b and 24c are presented by the following expressions on the basis of the potential at line 22:

$$V'a = (R1Ia + Vz - Vo)R7/(R4 + R7)$$
$$V'b = (R2Ib + Vz - Vo)R7/(R5 + R7)$$
$$V'c = (R3Ic + Vz - Vo)R7/(R6 + R7)$$

where Vo=potential at line 22 or analog ground potential,

The voltage the value of which is shown by (Vz-Vo) on the basis of the potential at line 22 is supplied from line 23 to inversion input terminal (−) of operational amplifier 26 through resistance R8. Any one of the analog voltage signals V'a, V'b and V'c is supplied to the non-inversion input terminal (+) of operational amplifier 26. Consequently, an amplified output voltage of operational amplifier 26 is shown by the following expressions:

$$Vxa = V'a(R8 + R9)/R8 - (Vz - Vo)R9/R8$$
$$Vxb = V'b(R8 + R9)/R8 - (Vz - Vo)R9/R8$$
$$Vxc = V'c(R8 + R9)/R8 - (Vz - Vo)R9/R8$$

where Vxa, Vxb, Vxc=amplified output voltages of operational amplifier 26 on the basis of the analog ground potential when analog voltage signals V'a, V'b and V'c are supplied thereto, respectively.

Since resistance values of resistances R4 to R9 are set so as to be represented as R4=R5=R6=R8=Ra and R7=R9=Rb, analog voltage signals V'a, V'b and V'c and amplified output voltages Vxa, Vxb and Vxc are obtained from the following expressions:

$$Va = (R1Ia + Vz - Vo)Rb/(Ra + Rb)$$
$$Vb = (R2Ib + Vz - Vo)Rb/(Ra + Rb)$$
$$Vc = (R3Ic + Vz - Vo)Rb/(Ra + Rb)$$
$$Vxa = Va(Ra + Rb)/Ra - (Vz - Vo)Rb/Ra$$
$$= IaR1Rb/Ra$$
$$Vxb = Vb(Ra + Rb)/Ra - (Vz - Vo)Rb/Ra$$
$$= IbR2Rb/Ra$$
$$Vxc = Vc(Ra + Rb)/Ra - (Vz - Vo)Rb/Ra$$
$$= IcR3Rb/Ra$$

Microcomputer 17 controls signal selecting means 14 as described above such that analog voltage signals Vxa, Vxb and Vxc with voltage levels proportional to detection current values Ia, Ib and Ic in accordance with the load currents of phases A, B and C respectively are obtained at output terminals of differential amplifier circuit 15. In this case, when resistance values of resistances R1, R2 and R3 forming respective I/V conversion circuits $9a$, $9b$ and $9c$ are equal to one another, analog voltage signals Vxa, Vxb and Vxc may be compared with one another on the same basis.

Analog voltage signals Vxa, Vxb and Vxc thus obtained are converted by A/D conversion circuit 16 to the digital voltage signals, which are input to microcomputer 17. In microcomputer 17, effective value operation means 33 operates to obtain the effective values of the load currents indicated by the digital voltage signals and trip operation means 34 operates to select the maximum effective value from the effective values of the phases to thereby determine the level of the selected effective value. A/D conversion circuit 16 performs its analog-to-digital conversion for the same time-divided period as that of signal selecting means 14 concurrently with time-division control of signal selecting means 14 in response to drive signals Sa-Sc. Microcomputer 17 determines presence or absence of a fault current based on the result of the level determination of the maximum effective load current value. Upon determining that the fault current has flown, microcomputer 17 operates to perform the time-limiting operation in accordance with the magnitude of the detected fault current and thereafter, generates a trigger pulse at output port $P_0$. Upon receipt of the trigger pulse at the gate, thyristor 18 is turned on to thereby energize tripping device 19. Consequently, the usual tripping operation of opening main contacts $2a$-$2c$ is performed.

On the other hand, when a large fault current such as short-circuit current flows through main power line conductors $3a$-$3c$, levels of analog voltage signals Va-Vc supplied from current detecting means 11 to the respective lines $8a$-$8c$ are rapidly increased. Consequently, the voltage between lines 33 and 7 is also increased via diode OR circuit 12 to thereby exceed the Zener voltage at a Zener diode 21, resulting in breakdown of Zener diode 21. Accordingly, time-limit control circuit 20 is energized to generate a trigger pulse after elapse of a predetermined time period in accordance with the applied voltage or load current value. Consequently, the trigger pulse is input to thyristor 18, which is turned on, thereby executing the instantaneous tripping operation wherein main power line switches $2a$-$2c$ are opened by tripping device 19.

Figure 4:
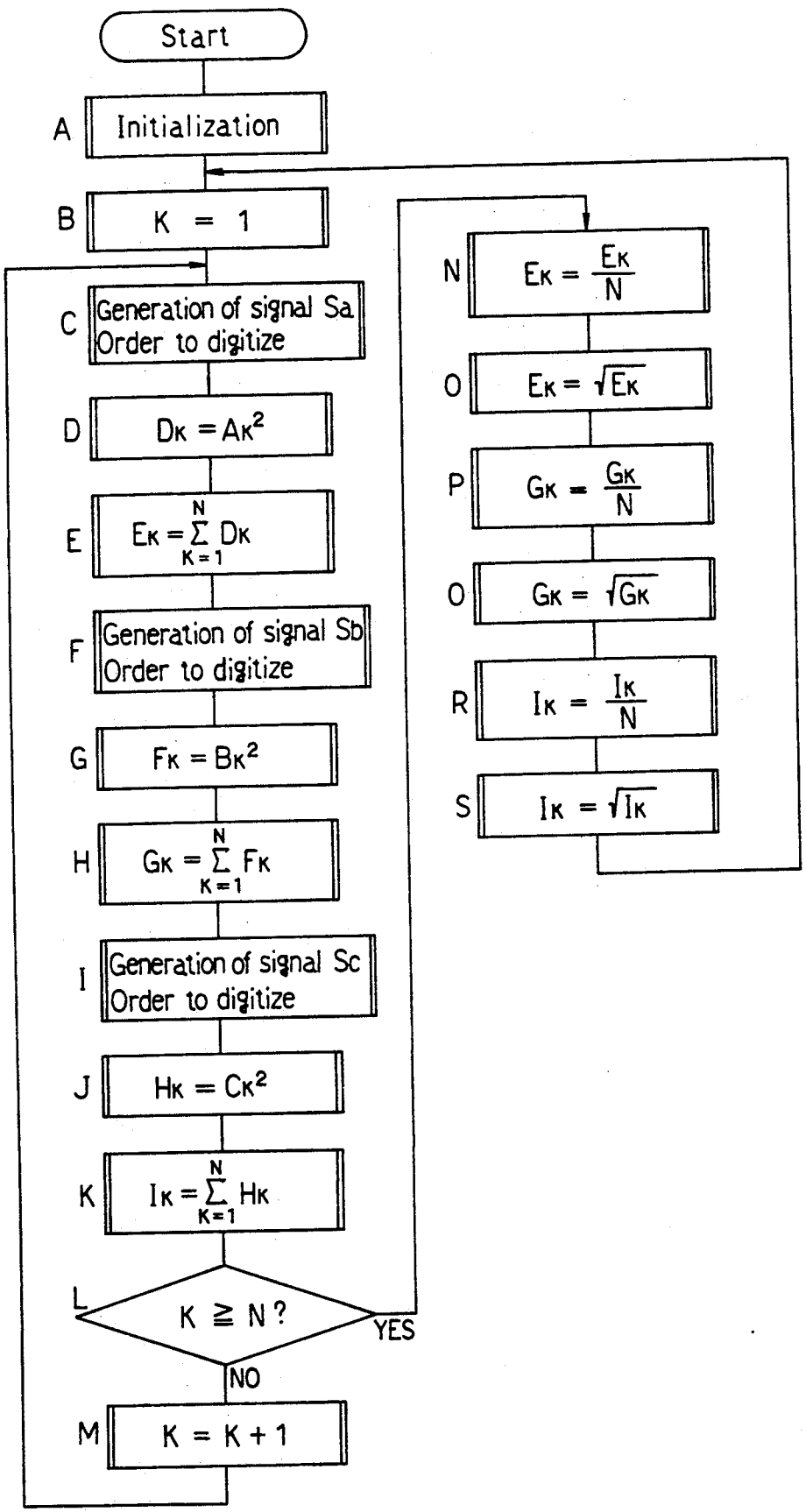
FIG. 4 is a flowchart showing the operation of the effective value operation means.

FIG. 4 illustrates an example of an operational program of effective load current value operation means 33 shown in FIG. 3. After execution of an initializing step A in response to the power supply to microcomputer 17, means 33 operates to set a variable K at initial value of "1" at step B. Subsequently, signal selecting means 14 is supplied with drive signal Sa and A/D conversion circuit 16 is supplied with a digitizing instruction at step C. Signal selecting means 14 allows phase A analog voltage signal Va to pass therethrough. The analog voltage signal Va is converted to a digital voltage signal for phase A by A/D conversion circuit 16. Squaring means 27 operates to obtain the squared value of digital data Ak indicated by the digital voltage signal and to store the operational result $Ak^2$ as data Dk at step D. Adder 28 operates to add the digital data Dk ($=Ak^2$) to accumulating memory data Ek at step E. The operational processing for phase A load current is thus performed by squaring means 27 and adder 28 at steps C, D and E.

Thereafter, drive signal Sb is supplied to signal selecting means 14 and the digitization start instruction is supplied to A/D conversion circuit 16 at step F. In this case, phase B analog voltage signal Vb is allowed to pass through signal selecting means 14 and converted to the phase B digital voltage signal by A/D conversion circuit 16. Squaring means 27 operates to obtain the squared value of digital data Bk indicated by the digital voltage signal and store the operational result $Bk^2$ as data Fk at step G. At step H, adder 28 operates to add the stored data Fk ($=Bk^2$) to the accumulating memory data Gk. The operational processing for phase B load current is thus performed by squaring means 27 and adder 28 at steps F, G and H.

Subsequently, drive signal Sc is supplied to signal selecting means 14 and the digitization start instruction is supplied to A/D conversion circuit 16 at step I. In this case, phase C analog voltage signal Vc is allowed to pass through signal selecting means 14 and converted to the digital voltage signal by A/D conversion circuit 16. Squaring means 27 operates to obtain the squared value of digital data Ck indicated by the digital voltage signal and store the operational result $Ck^2$ as data Hk at step J. At step K, adder 28 operates to add the stored data Hk ($=Ck^2$) to the accumulating memory data Ik at step K. The operational processing of phase C load current is thus performed by squaring means 27 and adder 28 at steps I, J and K in the same manner as in the case of the phase A load current.

At step L, subsequently, it is determined whether or not the variable K has reached a predetermined value N. When it is determined that the variable K has reached the predetermined value N, the variable K is incremented by "1" at step M and effective load current value operation means 33 returns to step C. In this case, when one cycle period of steps C to K is represented by $t_0$, a period T necessary for the variable K to be determined to have reached the predetermined value N at step L is shown by the equation, $T = N t_0$. Accordingly, the predetermined value N at each of steps E, H and K is represented by the equation, $N = T/t_0$. Steps L and N are allotted to determining means 30 and counting means 29, respectively.

When steps C to K are executed at N times, digital data Dk ($=Ak^2$), Fk ($=Bk^2$) and Hk ($=Ck^2$) for the respective phases are sampled at N times and the accumulative data Ek, Gk and Ik for the respective phases are obtained. In this case, it is determined at step L that the variable K has reached the predetermined value N. Then, digital data Ek is divided by the predetermined value N and the operational result, Ek/N is stored as new data Ek at step N. The square root value of stored data Ek, or the effective load current value of phase A is obtained at step O. Subsequently, digital data Gk is divided by the predetermined value N and the operational result, Gk/N is stored as new data Gk at step P. The square root value of stored data Gk, or the effective load current value of phase B is obtained at step Q. Similarly, digital data Ik is divided by the predetermined value N and the operational result, Ik/N is stored as new data Ik at step R. The square root value of stored data Ik, or the effective load current value of phase C is obtained at step S. Effective load current value operation means 33 returns to step B after execution of step S and repeats steps B to S. Steps N, P and R are allotted to division means 31 and steps O, Q and S are allotted to square root operation means 32.

The effective values of the load currents are thus obtained and supplied to tripping operation means 34. Tripping operation means 34 selects the maximum effective value from among those supplied thereto and determines the level of the maximum effective value. Tripping operation means 34 then operates tripping device 19 based on the result of determination.

The invention should not be limited by the foregoing description of the embodiment. For example, the signal processing circuit may comprise a digital circuit composed of discrete circuits In accordance with the foregoing embodiment, the A/D conversion circuit is provided for converting to the digital voltage signals the phase analog signals indicative of the values of load currents flowing through AC electrical paths of a plurality of phases. The digital voltage signals are supplied to the operation circuit for executing the tripping operation based on the load current values of the respective phases indicated by the digital voltage signals Since the operation circuit comprises the squaring means, adder, counting means, division means and square root operation means each of which is means for processing digital signals, necessary analog circuit elements may be reduced, thereby simplifying the circuit arrangement and reducing the production cost. Furthermore, since the time division signal selecting means is provided for selectively allowing the phase analog voltage signals from the current detecting means to pass therethrough to the amplification means in a predetermined order, the amplification means may not be provided with amplifying functions for the respective phases and a plurality of operational circuits for the respective phases may not be required. Consequently, the circuit arrangement may be simplified. Since the analog voltage signals for the respective phases are amplified at the same amplification factor, thereby restraining variation of amplified voltages. Further, since the digital signal processing is employed for the tripping operation, a troublesome output level adjustment required conventionally is not necessitated. Further, since the period necessary for obtaining the effective load current values by way of signal processing means may be rendered sufficiently short as compared with the period necessary for protecting the phases against overcurrent, the accuracy of the operational results may be improved. Although whether or not the tripping operation should be executed depends upon the operational results of square root operation means 32, it may be determined based on the operational results of division means.

Figure 5:
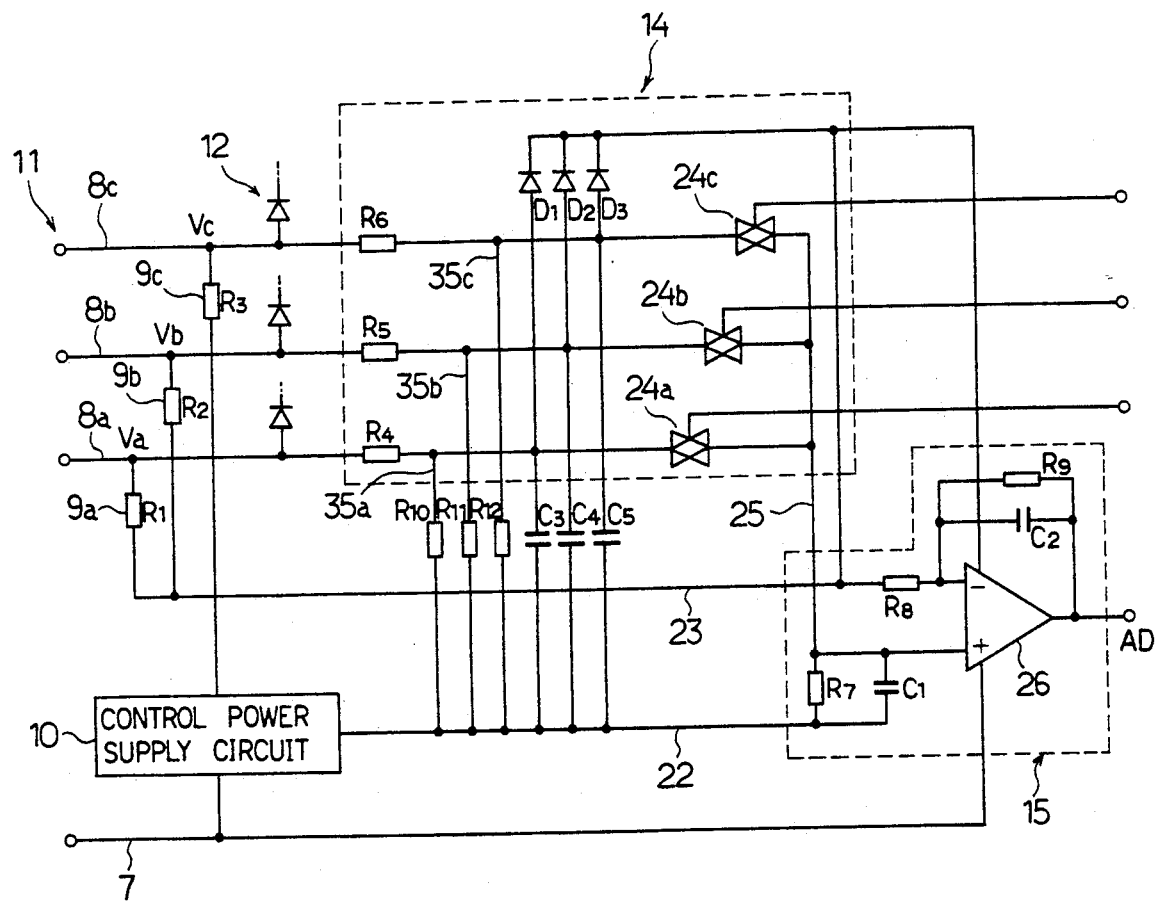
FIG. 5 is a view similar to FIG. 2 illustrating the circuit breaker of a second embodiment.

FIG. 5 illustrates the circuit breaker of a second embodiment Voltage divider circuits 35a, 35b and 35c are interposed between current detecting means 11 and signal selecting means 14. Analog voltage signals Va-Vc of the respective phases are divided and then supplied to signal selecting means 14. Arrangement of each of voltage divider circuits 35a-35c is simplified by utilizing resistances R4, R5 and R6 of signal selecting means 14. More specifically, voltage divider circuits 35a, 35b and 35c are composed by connecting resistances R10, R11 and R12 between input side terminals of respective analog switches 24a, 24b and 24c of signal selecting means 14 and line 22 which is at the analog ground potential and further by connecting noise condensers C3, C4 and C5 in parallel with the respective resistances R10, R11 and R12. Resistances R10-R12 have the same resistivity such that the voltage dividing ratios of voltage divider circuits 35a-35c are equalized.

The same effect may be achieved from the second embodiment as the first embodiment. Particularly, the circuit breaker of the second embodiment is advantageous in preventing excessively large analog voltage signals Va-Vc from being input.

Figure 6:
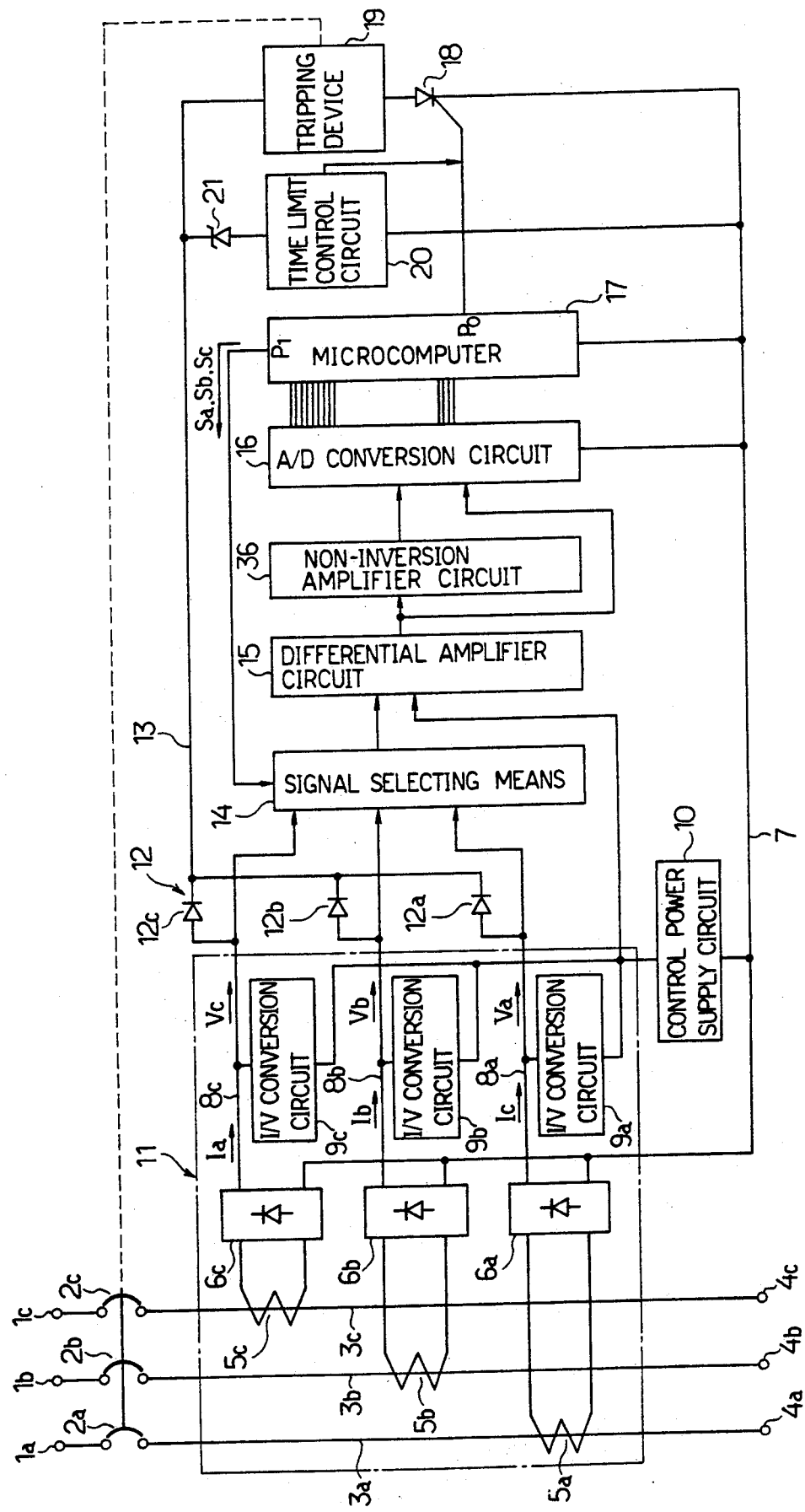
FIG. 6 is a view similar to FIG. 1 illustrating the circuit breaker of a third embodiment.
Figure 7:
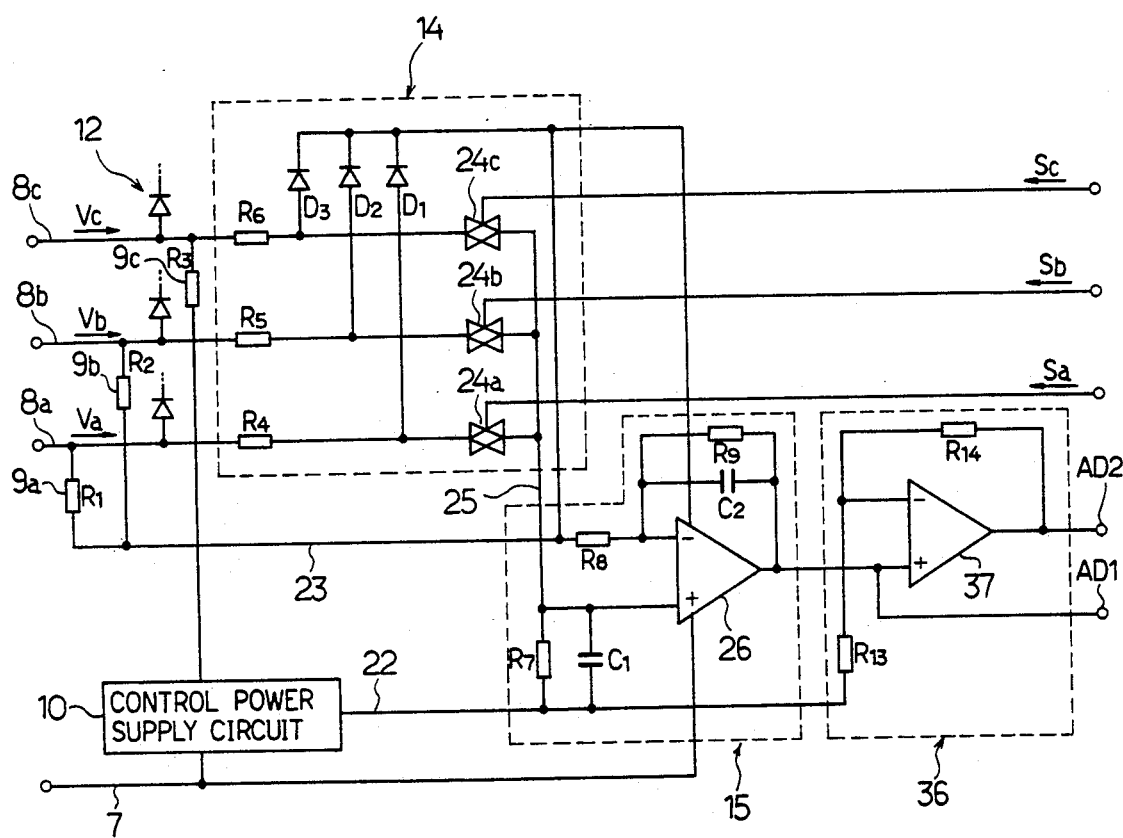
FIG. 7 is a wiring diagram of the major part of the circuit breaker in FIG. 6.
Figure 8:
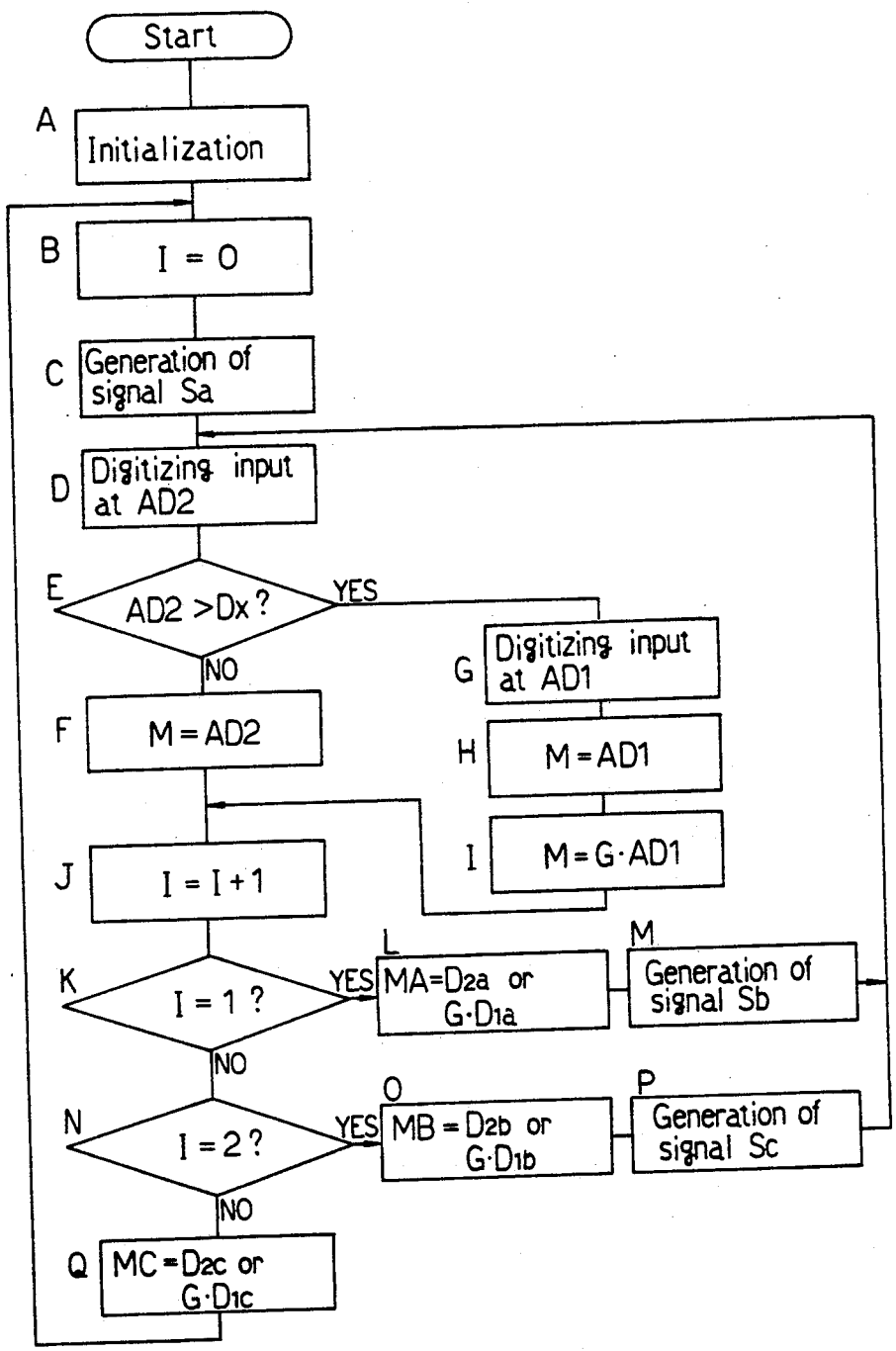
FIG. 8 is a flowchart showing the operation of the device shown in FIG. 6.

FIGS. 6 to 9 illustrate the circuit breaker of a third embodiment. When analog voltage signals Va-Vc each have a wide range of variation owing to wide ranges of variation of load currents flowing through the phases to be protected, the digital voltage signals obtained by converting low level analog voltage signals each have low accuracy in the case where the resolution of the A/D conversion circuit is low. Consequently, it cannot be determined with high accuracy whether or not the tripping operation should be performed. For preventing this, the resolution of A/D conversion circuit may be improved but it results in increase of the production cost of the circuit breaker The above-described problem may be solved by the circuit breaker of the third embodiment without increase of the production cost of the circuit breaker. Referring to FIG. 6, the circuit breaker of the third embodiment is characterized by a non-inversion amplifier circuit 36 provided between differential amplifier circuit 15 and A/D conversion circuit 16. The other arrangement is identified with that of the circuit breaker shown in FIG. 1 except the contents of the program of microcomputer 17.

In non-inversion amplifier circuit 36, an operational amplifier 37 is supplied with electrical power from lines 23 and 7 as its power source. The non-inversion input terminal (+) of operational amplifier 37 is connected to an output terminal of operational amplifier 26 and the inversion input terminal (−) of operational amplifier 37 is connected to line 22 through a resistance R13. A feedback resistance R14 is connected between an output terminal and inversion input terminal terminal (−) of operational amplifier 37. The output terminal of operational amplifier 37 is connected to an input terminal AD2 of A/D conversion circuit 17. The output terminal of operational amplifier 26 of differential amplifier circuit 15 is connected to the other input terminal of A/D conversion circuit 17.

In operation of the circuit breaker, microcomputer 17 delivers drive signals Sa, Sb and Sc to control signal selecting means 14 such that analog voltage signals Vxa, Vxb and Vxc of voltage levels proportional to load current values of the respective phases A, B and C are generated at the output terminal of differential amplifier 15, in the same manner as in the circuit breaker in FIG. 1.

An amplification factor G of non-inversion amplifier circuit 36 is given by (R14+R13)/R13. In the cases where analog voltage signals Vxa, Vxb and Vxc are supplied to non-inversion amplifier circuit 36 from differential amplifier circuit 15 respectively, amplified output voltages Vya, Vyb and Vyc of non-inversion amplifier circuit 36 are obtained by G.Vxa, G.Vxb and G.Vxc, respectively.

Microcomputer 17 controls the selective analog-to-digital conversion of analog signals Vxa-VXc and Vya-Vyc by A/D conversion circuit 16 and the above-described time-division selecting operation of signal selecting means 14. The control manner of microcomputer 17 will now be described with reference to FIG. 8. After execution of the initializing step A in response to the power supply to microcomputer 17, a variable I is set at an initial value of "0" at step B. Subsequently, signal selecting means 14 is supplied with drive signal Sa and A/D conversion circuit 16 is supplied with a digitizing order to digitize an input at input terminal AD2 at steps C and D. Signal selecting means 14 allows phase A analog voltage signal Va to pass therethrough. A/D conversion circuit 16 converts the analog voltage signal Vya from non-inversion amplifier circuit 36 to a second digital voltage signal D2a, thereby delivering the digital signal. At step E, data selecting means determines whether or not the second digital voltage signal D2a has exceeded a selecting predetermined value Dx, or whether or not the phase A load current value indicated by digital voltage signal D2a has exceeded a predetermined value. In the case where it is determined that digital voltage signal D2a has not exceeded the selecting predetermined value Dx, the data selecting means stores the digital voltage signal D2a data in an internal memory M at step F. When it is determined at step E that digital voltage signal D2a has exceeded the selecting predetermined value Dx, or when the phase A load current is relatively large, A/D conversion circuit 16 is ordered to digitize the input at input terminal AD1 thereof at step G. A/D conversion circuit 16 converts the analog voltage signal Vxa (lower in level than analog signal Vya) from differential amplifier circuit 15 to a first digital voltage signal D1a, which is delivered. Microcomputer 17 operates to store data of the first digital voltage signal D1a in the internal memory M and further, restore in memory M data of a voltage signal G D1a obtained by multiplying digital voltage signal D1a by amplification factor G of non-inversion amplifier circuit 36, at steps H and I. In other words, digital voltage signal D1a is compensated by the amplification factor of non-inversion amplifier circuit 36 at step I.

After execution of step F or I, the variable I is incremented by "1" at step J. Subsequently, it is determined at step k whether or not the variable I is "1." In this case, since it is determined that the variable I is "1," data of voltage signal D2a or G D1a is transferred from the internal memory M to a phase A internal memory MA at step L. Drive signal Sb is delivered to signal selecting means 14 at step M and then, microcomputer 17 returns to step D. Accordingly, a digital voltage signal D2b or G D1b corresponding to the load current value of phase B is stored in internal memory M at step F or I. Since the variable I is incremented to "2" at step J after step F or I, it is determined at step K that the variable I is not "1." Microcomputer 17 then advances to step N where it is determined whether or not the variable I is "2." Since it is determined at step N that the variable I is "2," data of voltage signal D2b or G D1b is transferred from the internal memory M to a phase B internal memory MB at step O.

Subsequently, drive signal Sc is delivered to signal selecting means 14 at step P and then, microcomputer 17 returns to step D. Accordingly, data of digital voltage signal D2c or G.D1c corresponding to the load current value of phase C is stored in internal memory M at step F or I. Since the variable I is incremented to "3" at step J after step F or I, it is determined at step K that the variable I is not "1" and at step N that the variable I is not "2," microcomputer 17 advances to step Q. Data of voltage signal D2c or G.D1c is transferred from internal memory M to a phase C internal memory MC at step Q and then, microcomputer 17 returns to step B.

Thereafter, steps B to Q are reiteratively executed as described above such that data of the digital voltage signals stored in the respective phase internal memories MA, MB and MC is sequentially renewed in the real-time manner. In this case, when each of analog voltage signals Vya, Vyb and Vyc supplied to terminal AD2 of A/D conversion circuit 16 does not exceed the predetermined value Dx, analog voltage signals Vya, Vyb and Vyc, or signals amplified by non-inversion amplifier circuit 36 are converted to second digital voltage signals D2a, D2b and D2c by A/D conversion circuit 16, respectively. When analog voltage signals Vya, Vyb and Vyc exceed the predetermined value Dx, analog voltage signals Vxa, Vxb and Vxc supplied to terminal AD1, or signals unamplified by non-inversion amplifier circuit 36 are converted to first digital voltage signals D1a, D1b and D1c by A/D conversion circuit 16, respectively.

More specifically, when the amplification factor of non-inversion amplifier circuit 36 is set at "5" and an overcurrent protection is so set as to cover the range up to 1,000% current which is ten times as large as the rated load current (100% current), analog voltage signals Vya, Vyb and Vyc amplified by non-inversion amplifier circuit 36 are supplied to A/D conversion circuit 16 in the case where the load current is within the range up to 200% of the rated current. When the load current is in the range between 200% and 1,000% of the rated current, analog voltage signals Vxa, Vxb and Vxc unamplified by non-inversion amplifier circuit 36 are supplied to A/D conversion circuit 16. Microcomputer 17, which receives the output of A/D conversion circuit 16, compensates first digital voltage signals D1a-D1c by the amplification factor G of non-inversion amplifier circuit 36. Accordingly, when either group of first and second digital voltage signals D1a-D1c and D2a-D2c is input, the linear proportional relationship thereof relative to the load currents indicated by these voltage signals may be maintained.

Figure 9:
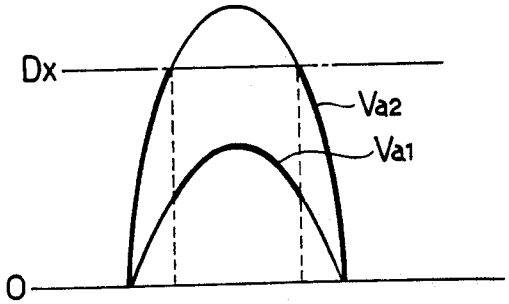
FIG. 9 is a graph showing the voltage waveform relating to the circuit breaker of the third embodiment.

The foregoing control manner of microcomputer 17 will now be described more specifically with reference to FIG. 9. In FIG. 9, reference symbol Va1 designates a voltage waveform of output delivered at output terminal AD1 of differential amplifier circuit 26 and reference symbol Va2 designates a voltage waveform of output delivered at output terminal AD2 of non-inversion amplifier circuit 37. Since these voltage waveforms are time-divided, the voltage waveforms actually come about partly, though they are shown as full waveforms for explanation purpose. As the result of the selection at step E, data of portions of the waveforms shown by bold lines is utilized as data on which it is determined whether or not the tripping operation of the circuit breaker should be performed.

Based on the previously stored program and digital voltage signals real-time stored in the respective phase internal memories MA, MB and MC, microcomputer 17 executes the operation to obtain the effective load current values or mean value of the phases, selection of the maximum phase load current value and determination of levels of the respective phase load currents, in the same manner as in the first embodiment. Microcomputer 17 detects a fault current based on the results of the foregoing level determination. When detecting the presence of the fault current, microcomputer 17 performs a time-limiting operation in accordance with magnitude of the fault current and then delivers a trigger pulse at output port $P_O$. Upon receipt of the trigger pulse, thyristor 18 is turned on to energize tripping device 19, thereby opening main contacts 2a, 2b and 2c.

In accordance with the third embodiment, the circuit breaker comprises amplification means for amplifying analog voltage signals indicative of the respective load currents flowing through AC electrical paths of a plurality of phases, the analog-to-digital conversion circuit for converting the analog voltage signals amplified by amplification means to the respective first digital voltage signals and the analog voltage signals unamplified by amplification means to the respective second digital voltage signals, and operation means. When the load currents indicated by the second digital voltage signals exceed the predetermined value, operation means operates to execute the tripping operation based on the operational processing of the first digital voltage signals. When the load currents indicated by the second digital voltage signals are below the predetermined value, operation means operates to execute the tripping operation based on the second digital voltage signals. As the result of the above-described arrangement, linearity of the load currents indicated by the digital voltage signals may be maintained and accordingly, stable tripping characteristics may be ensured over the range of the overcurrent. Furthermore, since the analog-to-digital conversion circuit is not required of high resolution, thereby preventing complexity of the circuit arrangement and reducing the production cost of the circuit breaker.

A fourth embodiment of the invention will now be described with reference to FIGS. 1, 2 and 10 to 12. Electrical arrangements of the circuit breaker of the fourth embodiment are identical with those shown in FIGS. 1 and 2 except contents of the program of the microcomputer. Accordingly, the operation up to the step where analog voltage signals Vxa, Vxb and Vxc shown by the following expressions are obtained at output terminal AD of operational amplifier 26 is identical with that shown in FIGS. 1 and 2:

$$Vxa = Va(Ra + Rb)/Ra - (Vz - Vo)Rb/Ra$$
$$= IaR1Rb/Ra$$
$$Vxb = Vb(Ra + Rb)/Ra - (Vz - Vo)Rb/Ra$$
$$= IbR2Rb/Ra$$
$$Vxc = Vc(Ra + Rb)/Ra - (Vz - Vo)Rb/Ra$$
$$= IcR3Rb/Ra$$

In the fourth embodiment, analog voltage signals Vxa, Vxb and Vxc thus obtained are converted to the digital voltage signals by A/D conversion circuit 1 6 and subsequently, the digital voltage signals are input to microcomputer 17. Microcomputer 17 operates to select the maximum values of the load currents indicated by the respective digital voltage signals based on the previously set program, thereby determining the levels of the respective load currents. Based on the results of the level determination, microcomputer 17 operates to execute the time-limiting operation in accordance with the magnitude of the fault current and then, deliver the trigger pulse from output port $P_O$ in accordance with the inverse time-limit characteristic shown in FIG. 12. Upon receipt of the trigger pulse at the gate, thyristor 18 is turned on to energize tripping device 19, thereby opening main contacts 2a, 2b and 2c.

Figure 10:
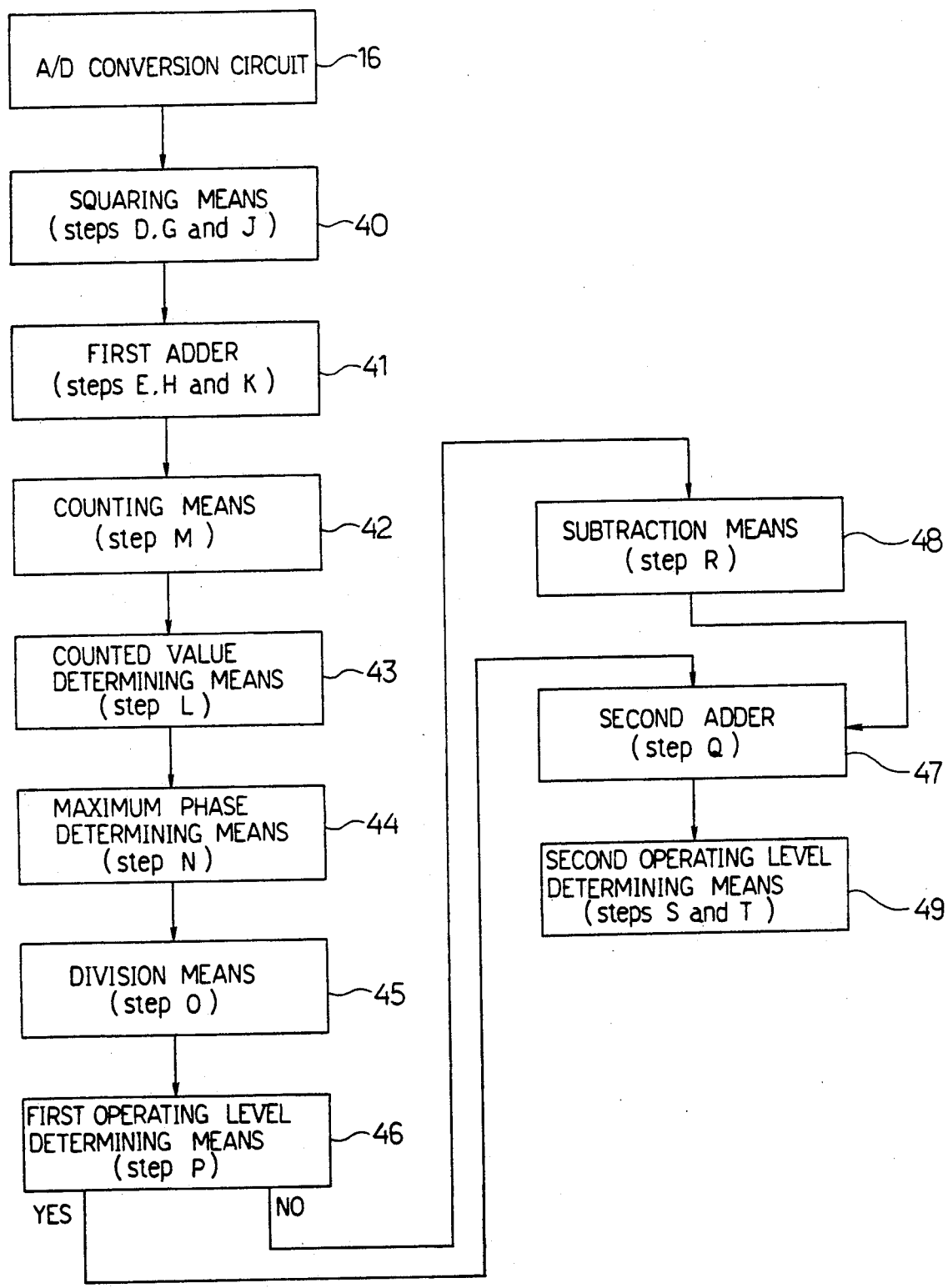
FIG. 10 is a block diagram of the circuit breaker of a fourth embodiment for explaining the function thereof.
Figure 11:
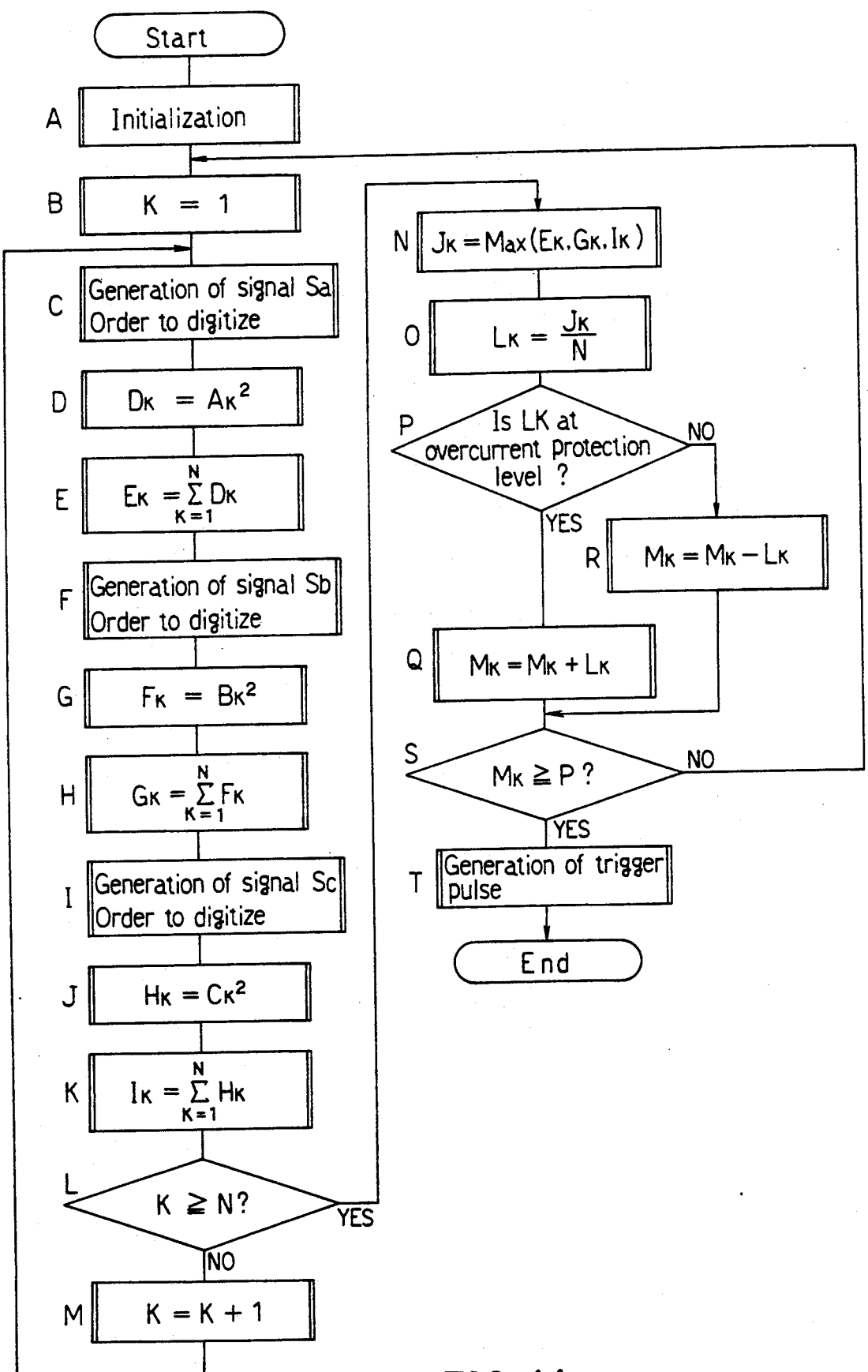
FIG. 11 is a flowchart showing the operation of the circuit breaker of the fourth embodiment.

The tripping operation in accordance with the inverse time-limit characteristic will be described with reference to FIGS. 10 and 11. FIG. 10 is a block diagram showing functions of inverse time-limit operation section of the microcomputer. In FIG. 11, after execution of an initializing step A in response to the power supply to microcomputer 17, the variable K is set at the initial value of "1," at step B. Subsequently, signal selecting means 14 is supplied with drive signal Sa and A/D conversion circuit 16 is supplied with a digitizing instruction at step C. Signal selecting means 14 allows phase A analog voltage signal Va to pass therethrough. The analog voltage signal Va is then converted to a digital voltage signal for phase A by A/D conversion circuit 16. The digital data Ak indicated by the digital voltage signal Va is squared and the operational result $Ak^2$ is stored as data Dk at step D allotted to squaring means 40. First adder 41 operates to add the digital data Dk ($=Ak^2$) to accumulating memory data Ek at step E allotted to first adder 41.

Subsequently, drive signal Sb is supplied to signal selecting means 14 and the digitizing start instruction is supplied to A/D conversion circuit 16. Accordingly, signal selecting means 34 allows phase B analog voltage signal Vb to pass therethrough. Analog voltage signal Vb is then converted to phase B digital voltage signal by A/D conversion circuit 16. At step G allotted to the squaring means, the digital data Bk indicated by the digital voltage signal is squared and the operational result $Bk^2$ is stored as data Fk in the squaring means. The data Fk ($=Bk^2$) thus stored is added to accumulating memory data Gk at step H allotted to the first adder.

Drive signal Sc is supplied to signal selecting means 14 and digitizing start order is supplied to A/D conversion circuit 16 at step I. Signal selecting means 14 then allows phase C analog voltage signal Vc to pass therethrough. The voltage signal Vc is then converted to the phase C digital voltage signal by A/D conversion circuit 16. At step J allotted to the squaring means, the digital data Ck indicated by the phase C digital voltage signal is squared and the operational result $Ck^2$ is stored as data Hk in the squaring means. The stored data Hk ($=Ck^2$) is added to the accumulating memory data Ik at step K allotted to the first adder. The above-described steps C to K are reiteratively executed in a predetermined cycle until it is determined that variable K has exceeded the predetermined value N. Accordingly, the above-described squaring and adding operations are performed in a predetermined cycle.

Subsequently, it is determined whether or not the variable K has reached the predetermined value N, at step L. When it is determined that the variable K has not reached the value N, the variable K is incremented by "1" at step M allotted to counting means 42. Microcomputer 17 thereafter returns to step C. In this case, when one cycle period of steps C to K is represented by $t_O$, a period T necessary for the variable K to be determined to have reached the predetermined value N at step L is shown by the equation, $T = N \cdot t_O$. Accordingly, the predetermined value N at each of steps E, H and K is represented by the equation, $N = T/t_O$.

When steps C to K are executed at N times, digital data Dk ($=Ak^2$), Fk ($=Bk^2$) and Hk ($=Ck^2$) for the respective phases are sampled at N times and the accumulative data Ek, Gk and Ik for the respective phases are obtained. In this case, it is determined that the variable K has reached the predetermined value N, at step L allotted to counted value determining means 43. Then, the maximum one is selected from the accumulative data Ek, Gk and Ik, at step N allotted to maximum phase selecting means 44, thereby storing the selected data as maximum value data Jk. The operation in step N in FIG. 11 is not present in the means in FIG. 3. The maximum value data Jk is divided by the predetermined value N and the operational result, Jk/N (=Jk.t0/T) is stored as division data Lk at step 0 allotted to division means 45.

Subsequently, it is determined whether or not the division data Lk has reached an overcurrent indicative level, at step P allotted to first operating level determining means. When it is determined at step P that the division data Lk has reached the overcurrent indicative level, second adder 47 operates to add the division data Lk to accumulating memory data Mk at step Q. On the other hand, when it is determined that the division data Lk has not reached the overcurrent indicative level, subtraction means 48 operates to subtract division data Lk from accumulating memory data Mk at step R. Steps Q and R are reiteratively performed in a predetermined cycle until it is determined that accumulating memory data Mk has exceeded a predetermined value P, at step S allotted to second operating level determining means 49. Accordingly, the above-described addition and subtraction are performed in a predetermined cycle. When it is determined at step S that accumulating memory data Mk has exceeded the predetermined value P, a trigger pulse is delivered from output port P0 at step T and then the operation is terminated. Upon termination of the operation, the tripping operation is executed in response to the trigger pulse. When it is determined at step S that accumulating memory data Mk has not exceeded the predetermined value P, the microcomputer returns to step B to repeat the steps in the same manner as described above.

Figure 12:
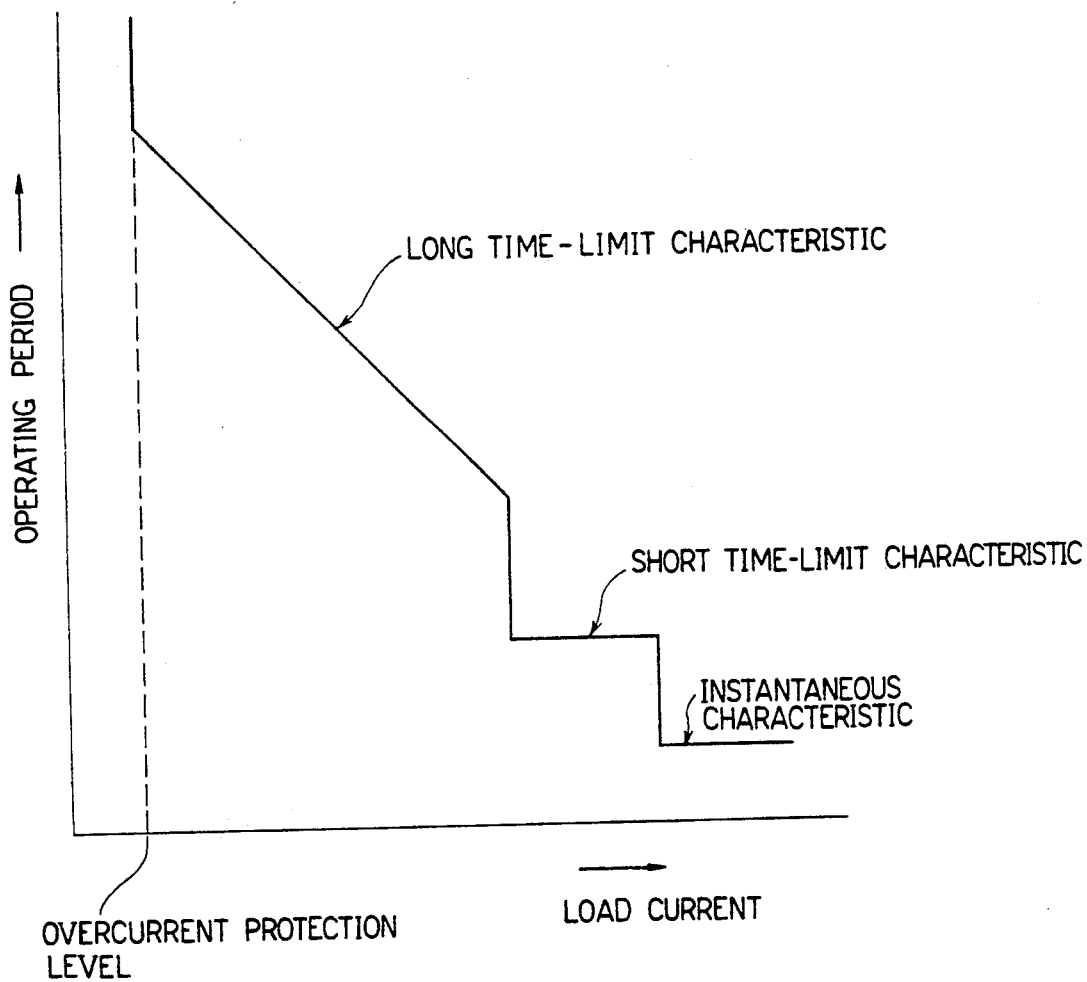
FIG. 12 is a graph showing the operating characteristic of the circuit breaker of the fourth embodiment.

Generally, the protection characteristic of circuit breakers is set as shown in FIG. 12 which is plotted in the logarithmic form. When the load current exceeds the overcurrent indicative level, a long time-limit operation, short time-limit operation or instantaneous operation is executed in accordance with the magnitude of the load current. Particularly, in the range of the long time-limit operation corresponding to the overcurrent protection operation performed by microcomputer 17 in the present invention, microcomputer 17 is operated in accordance with the inverse time-limit characteristic that the operation period is inversely proportional to the squared load current value. More specifically, microcomputer 17 operates in the long time-limit operation range so that the expression, (load current)$^2$×(operation period)=a constant is obtained.

The operation in FIG. 11 to obtain the effective load current and inverse time-limit characteristic of microcomputer 17 shown in FIG. 1 will now be described. As well known, the effective value Ie of the current having an instantaneous value i(T) and period T is obtained by the following expression:

$$Ie = \sqrt{\frac{1}{T} \int_0^T i^2(t) dt}$$

When data obtained by sampling the instantaneous value i(t) for period t0 is represented by i1(t), i2(t), ... ik(t), the effective load current is approximated to the following expression:

$$Ie \approx \sqrt{\frac{1}{T} (i1^2(t) \cdot t0 + i2^2(t) \cdot t0 + \ldots + ik^2(t) \cdot t0)}$$

The number of times of the sampling or K (corresponding to predetermined value N in the foregoing embodiment) is obtained by the expression, K=T/t0 (=N) since the period necessary for K times of sampling is represented by the period T. Accordingly, the effective load current Ie is obtained by the following expression:

$$Ie = \sqrt{\frac{t0}{T} \left( \sum_{k=1}^{T/t0} ik^2(t) \right)}$$

On the other hand, when the operation period is represented by Top, the inverse time-limit characteristic may be shown by the following expression:

$$Ie^2 \cdot Top = Pa$$

where Pa=a constant

From this expression, the requirement for the inverse time-limit characteristic is shown by the following expression:

$$\frac{t0}{T} \cdot \sum_{k=1}^{T/t0} ik^2(t) \cdot Top = Pa$$

Accordingly, the operation period Top is expressed as follows:

$$Top = PA / \frac{t0}{T} \cdot \sum_{k=1}^{T/t0} ik^2(t) \quad (1)$$

When the above-mentioned expressions are considered in conjunction with FIG. 11, the accumulative data, $$\sum_{k=1}^{T/t0} ik^2(t)$$

for the phases are obtained by operations in steps E, H and K, respectively. From among the accumulative data thus obtained, the maximum one is selected at step N and the division data Lk shown by the following expression is obtained based on the selected maximum accumulative data:

$$Lk = \frac{t0}{T} \cdot \sum_{k=1}^{T/t0} ik^2(t)$$

When division data Lk thus obtained exceeds the overcurrent indicative level, the division data Lk is accumulated as accumulating memory data Mk in the predetermined cycle at step Q. Accordingly, the period necessary for accumulating memory data Mk to reach the predetermined value P, or the operation period Top is obtained by the following expression:

$$Top = P/\frac{t0}{T} \cdot \sum_{k=1}^{T/t0} ik^2(t) \times Ta = P \cdot Ta/\frac{t0}{T} \cdot \sum_{k=1}^{T/t0} ik^2(t)$$

where Ta=accumulating period

Where P·Ta=P (a constant) in the expression, the following expression holds:

$$Top = P/\frac{t0}{T} \cdot \sum_{k=1}^{T/t0} ik^2(t)$$

This expression agrees with expression (1). Consequently, it can be confirmed that the operational processing in FIG. 11 realizes the operation to obtain the effective load current and inverse time-limit characteristic.

The foregoing disclosure and drawings are merely illustrative of the principles of the present invention and are not to be interpreted in a limiting sense. The only limitation is to be determined from the scope of the appended claims.

What we claim is:

1. A circuit breaker comprising main contacts for closing and opening electrical power supply paths of respective phases connected between loads and a polyphase AC power supply, current detecting means for detecting load currents flowing through the respective power supply paths, thereby generating analog voltage signals having levels corresponding to the detected load currents, control means for tripping the main contacts in response to the analog voltage signals generated by the current detecting means, thereby opening the power supply paths, said control means comprising:

a) signal selecting means having a gate and repeating a time division selecting operation that one of the analog phase voltage signals generated by the current detecting means is selectively allowed to pass through the gate in a predetermined order;

b) amplification means for amplifying the analog voltage signals passing through the gate of the signal selecting means;

c) analog-to-digital conversion means for selectively converting the analog voltage signals unamplified and amplified by the amplification means to first and second digital voltage signals, respectively; and d) operation means comprising a microcomputer including drive signal generating means for generating a drive signal for controlling the gate of the signal selecting means and data selecting means for selecting either the first or the second digital voltage signal from the analog-to-digital conversion means, the operation means generating a tripping order when one of the first and second digital voltage signals selected by the data selecting means exceeds a reference value, thereby tripping the main contacts, the data selecting means comparing the second digital voltage data indicative of the amplified analog voltage with a predetermined selection value and selecting the first digital voltage signal when the second digital voltage data exceeds the predetermined selection value, the data selecting means selecting the second digital voltage signal when the second digital voltage data is below the predetermined selection value.

* * * * *